(12) United States Patent
Kim

(10) Patent No.: US 7,747,162 B2
(45) Date of Patent: Jun. 29, 2010

(54) POP-UP MODULE FOR ELECTRONIC DEVICE

(75) Inventor: Young-oog Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 12/157,493

(22) Filed: Jun. 10, 2008

(65) Prior Publication Data
US 2009/0034957 A1 Feb. 5, 2009

(30) Foreign Application Priority Data
Aug. 2, 2007 (KR) ...................... 10-2007-0077823

(51) Int. Cl.
*G03B 15/03* (2006.01)
(52) U.S. Cl. ...................... 396/177; 348/371
(58) Field of Classification Search ................. 396/177; 362/3; 348/370, 371; 313/524
See application file for complete search history.

(56) References Cited
U.S. PATENT DOCUMENTS

| | | | |
|---|---|---|---|
| 5,012,269 A | 4/1991 | Tosaka et al. | |
| 5,363,162 A | 11/1994 | Kaihara et al. | |
| 5,384,612 A | 1/1995 | Kaihara et al. | |
| 5,565,941 A | 10/1996 | Kaneko | |
| 2002/0001467 A1* | 1/2002 | Tanaka et al. | ............... 396/177 |
| 2006/0072916 A1 | 4/2006 | Liu | |
| 2006/0153559 A1 | 7/2006 | Kim | |

FOREIGN PATENT DOCUMENTS

| | | |
|---|---|---|
| JP | 2001-005055 A | 1/2001 |
| KR | 10-2005-0090801 A | 9/2005 |

* cited by examiner

*Primary Examiner*—Christopher E Mahoney
*Assistant Examiner*—Autumn Parker
(74) *Attorney, Agent, or Firm*—Drinker Biddle & Reath LLP

(57) ABSTRACT

A pop-up module for an electronic device. The pop-up module includes a pop-up member, a base where the pop-up member is rotatably installed, a first elastic member, a projection unit disposed in the pop-up member, a moving member, a second elastic member, a first rotating lever unit, a operating unit including a movement portion and a driving portion, a second rotating lever unit including a contacting portion and a hanging portion, and a third elastic member.

19 Claims, 8 Drawing Sheets

POP-UP MODULE FOR ELECTRONIC DEVICE

CROSS-REFERENCE TO RELATED PATENT APPLICATION

This application claims the benefit of Korean Patent Application No. 10-2007-0077823, filed on Aug. 2, 2007, in the Korean Intellectual Property Office, the contents of which being incorporated herein in its entirety by reference.

BACKGROUND OF THE INVENTION

1. Field of the Invention

The present invention relates to a pop-up module for an electronic device, and more particularly, to a pop-up module that includes a pop-up member and is used in an electronic device.

2. Description of the Related Art

A flash device is generally used to illuminate scenes that do not have enough available light in order to adequately take a photograph with a photographing apparatus (e.g., a camera or a camcorder). As photographing apparatuses have been gradually miniaturized, they are sometimes designed to have a pop-up flash structure so that a flash device can be exposed to the outside of the photographing apparatus only when necessary. Furthermore, many other electronic devices in addition to photographic apparatuses have been configured to have a pop-up structure due to space and design limitations.

Accordingly, the size of a pop-up structure should be reduced in order to effectively use the inner space of a corresponding device. In addition, there is a need for a simple pop-up structure in order to reduce manufacturing costs.

SUMMARY OF THE INVENTION

The present invention provides a pop-up module for an electronic device, which has a simple structure and a small volume.

Accordingly, an embodiment of the present invention provides a pop-up module for an electronic device, comprising a pop-up member, and a base where the pop-up member is rotatably installed. The pop up module further comprises a first elastic member that stores elastic potential energy according to a rotation motion of the pop-up member, a projection unit that is disposed at the pop-up member, a moving member that is pressed downward by the pop-up member when the pop-up member is in its shut position in the pop-up module, and a second elastic member, one end of which receives twisting moment by the moving member when the pop-up member is in its shut position in the pop-up module. The pop-up module also comprises a first rotating lever unit installed rotatably on the base, such that one end of the first rotating lever unit receives a force from the second elastic member when the pop-up member is in its shut position in the pop-up module, and a working pin is installed on other end of the first rotating lever unit, an operating unit including a movement portion having a slot into which the working pin is inserted and a driving portion driving the movement portion, a second rotating lever unit rotatably installed on the base, such that one end of the second rotating lever unit is a contacting portion contacting the movement portion, and other end of the second rotating lever unit is a hanging portion hanged with the projection unit when the pop-up member is in its shut position in the pop-up module, and a third elastic member that stores elastic potential energy when the second rotating lever unit is rotated.

The pop-up member may be installed on the base using a hinge structure. The first elastic member may be a torsion coil spring that is arranged around a hinge pin of the hinge structure. A groove may be formed in a bottom surface of the moving member, wherein one end of the second elastic member may be inserted in the groove. The second elastic member may be a torsion coil spring, and the second elastic member may be arranged around a first installation pin placed on the base.

A first installation hole may be formed in the first rotating lever unit and a second installation pin is inserted into the first installation hole to rotatably install the first rotating lever unit on the base. An installation hole may be formed in a part of the first rotating lever unit which receives a force from the second elastic member, and a part of the second elastic member may be inserted into the installation hole. The operating unit may be a solenoid.

When power may be supplied to the solenoid, a magnetic force may disappear to make the movement portion to be movable, and when a power may be not supplied to the solenoid, the movement portion may be fixed due to the magnetic force. When the movement portion may be extendable, the movement portion may press the contacting portion due to an elastic force of the second elastic member to move. When the movement portion may apply a force to the contacting portion to rotate the second rotating lever unit, the projection unit may escape from the hanging portion.

Also, a second installation hole may be formed in the second rotating lever unit, and a third install pin may be inserted into the second installation to rotatably install the second rotating lever unit. The third elastic member may a torsion coil spring that is arranged around the third install pin.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter exemplary embodiments of the present invention will be described in detail with reference to the attached drawings.

Figure 1:
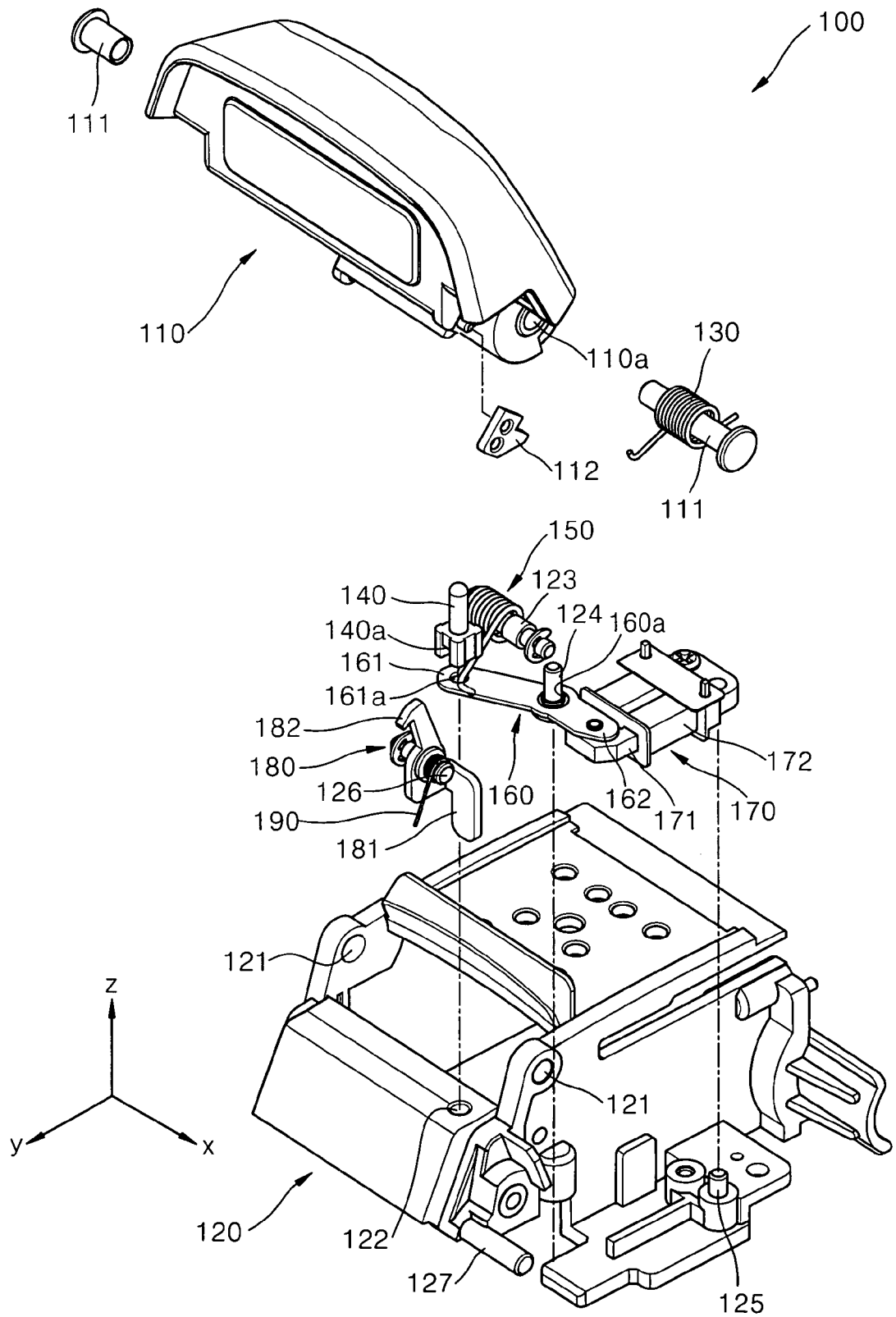
FIG. 1 is an exploded perspective view of an example of a pop-up module according to an embodiment of the present invention.
Figure 2:
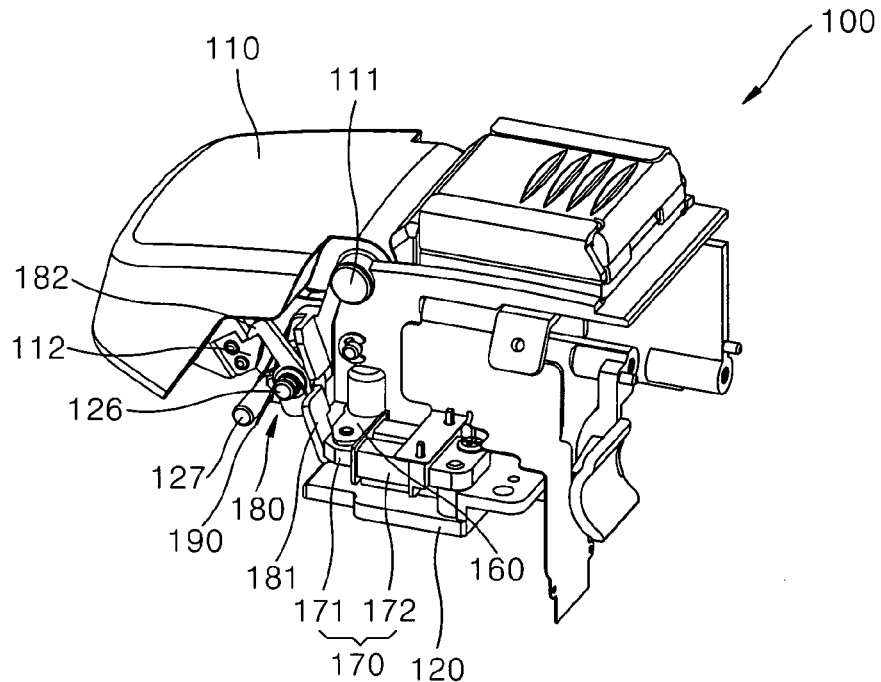
FIG. 2 is a perspective view illustrating the shut position state of a pop-up member and the pop-up module of FIG. 1, according to an embodiment of the present invention.
Figure 3:
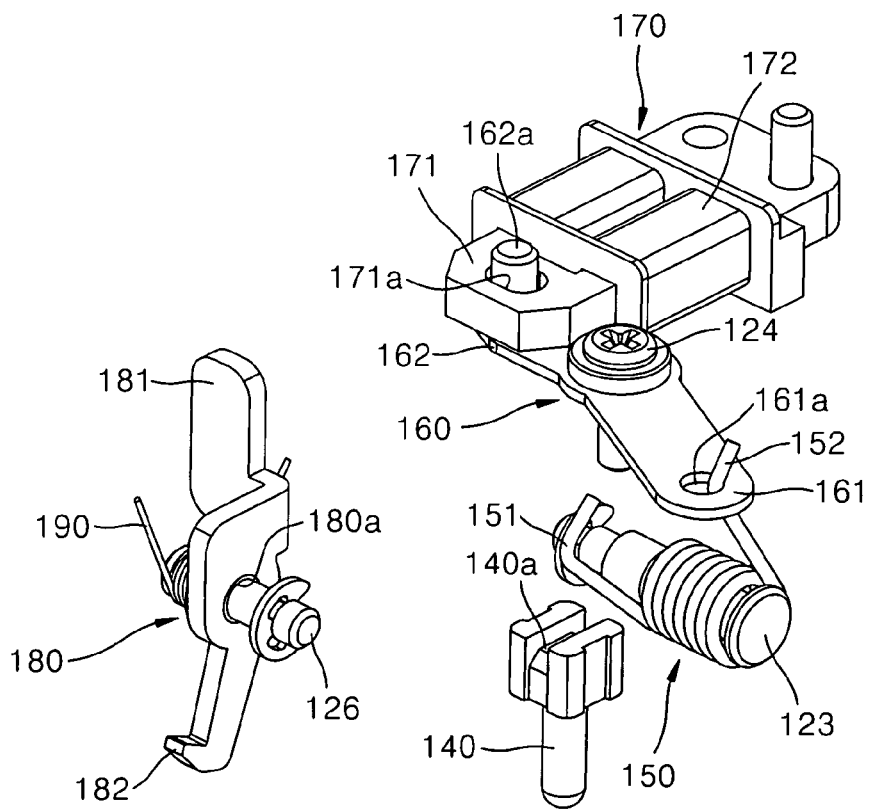
FIG. 3 is a bottom perspective view illustrating an example of a moving member, a second elastic member, a first rotating lever unit, a solenoid, a second rotating lever unit and a third elastic member of the pop-up module of FIG. 1.

FIG. 1 is an exploded perspective view of a pop-up module 100 according to an embodiment of the present invention. FIG. 2 is a perspective view illustrating a shut position of a pop-up member 110 and the pop-up module 100, according to an embodiment of the present invention. FIG. 3 is a bottom perspective view illustrating a moving member 140, a second elastic member 150, a first rotating lever unit 160, a solenoid 170, a second rotating lever unit 180, and a third elastic member 190 of the pop-up module 100 of FIG. 1. Referring to FIGS. 1, 2 and 3, the pop-up module 100 includes the pop-up member 110, a base 120, a first elastic member 130, the moving member 140, the second elastic member 150, the first rotating lever unit 160, the solenoid 170, the second rotating lever unit 180, and the third elastic member 190.

The pop-up member 110 is rotatably installed on the base 120. When the pop-up module 100 is used in a flash unit of a camera, a lamp or the like (e.g., a light emitting unit) is installed in the pop-up member 110.

In this example, the pop-up member 110 is installed on the base 120 using a hinge structure and hinge pins 111. That is, a hinge hole 110a is formed in the pop-up member 110, and a hinge pin hole 121 is formed in the base 120. The hinge pins 111 pass through the hinge pin hole 121 and are fitted into the hinge hole 110a. Thus, the pop-up member 110 can rotate around the hinge pins 111 during a pop-up operation. The hinge pins 111 are disposed in an x-axis direction of FIG. 1.

The pop-up member 110 is illustrated to be installed on the base 120 using two hinged pins 111, however, any suitable fastening mechanism can be. According to an embodiment of the present invention, the pop-up member 110 can be rotatably installed on the base 120, using the axis of rotation instead of the hinge pins 111.

The base 120 constitutes a frame of the pop-up module 100, and may be formed of a material such as a metal, a plastic resin, or the like. The first elastic member 130 in this example is a torsion coil spring and is disposed on one of the hinge pins 111.

During the rotation of the pop-up member 110 from a pop-up position to the shut position in the pop-up module 100, the first elastic member 130 receives twisting moment on the hinge pin 111 and thus stores elastic potential energy. Accordingly, when the pop-up member 110 is slightly rotated from the shut position in the pop-up module 100, the pop-up member 110 pops-up to its pop-up position automatically due to the elastic energy of the first elastic member 130.

A projection unit 112 is installed at one side of the pop-up member 110, and is spaced apart from a location at which the hinge pins 111 are installed. When the pop-up member 110 is in the shut position, the projection unit 112 is hanged with a hanging portion 182.

According to this exemplary embodiment, the projection unit 112 is separately formed from the pop-up member 110, and then the projection unit 112 is attached to the pop-up member 110 using a screw, or the like. However, the projection 112 and the pop-up member 110 can be integrally formed or formed in any other suitable manner.

In this example, the moving member 140 has a cylindrical shape and is disposed in a guide hole 122 formed in the base 120 and having a hallow-cylindrical shape. Accordingly, the moving member 140 can move vertically in the guide hole 122. That is, the moving member 140 can move in a z-axis direction of FIG. 1.

When the pop-up member 110 is in the shut position, the moving member 140 is pressed by a part of the pop-up member 110. Then, when the pressed moving member 140 moves downward, one end 151 of the second elastic member 150 is pressed by the moving member 140.

As illustrated in FIG. 3, a groove 140a is formed in a bottom surface of the moving member 140. When the pop-up member 110 is in the shut position, the one end 151 of the second elastic member 150 is pressed in the groove 140a, and thus a twisting moment is applied to the second elastic member 150.

In this example, the second elastic member 150 is arranged on the first installation pin 123 which is fixed on the base 120, the first installation pin is arranged in the x-axis direction of FIG. 1. Also, in this example, the first installation pin 123 and the base 120 are separately formed from each other, and then the first installation pin 123 is installed on the base 120 using an interference fit. However, the first installation pin 123 and the base 120 may be integrally formed or formed in any other suitable manner. In addition, the first installation pin 123 may be installed on the base 120 using other means such as an adhesive or welding.

The second elastic member 150 in this example is a torsion coil spring. When the pop-up member 110 is in the shut position, the second elastic member 150 transfers an elastic force to the first rotating lever unit 160.

That is, when the pop-up member 110 is in the shut position, the one end 151 of the second elastic member 150 is fitted into the groove 140a of the moving member 140. Other end 152 of the second elastic member 150 is inserted in the hole 161a formed in one end 161 of the first rotating lever unit 160. Accordingly, as described above, when the pop-up member 110 is in the shut position and the one end 151 of the second elastic member 150 is pressed by the moving member 140, a twisting moment is applied to the second elastic member 150, and thus the second elastic member 150 transfers a predetermined force to the first rotating lever unit 160.

The first rotating lever unit 160 is rotatably installed on the base 120. A first installation hole 160a is formed in the center of the first rotating lever unit 160. A working pin 162a is formed on other end 162 of the first rotating lever unit 160.

The second installation pin 124 corresponding to the first installation hole 160a is installed on the base 120 in the z-axis direction of FIG. 1. The second installation pin 124 is inserted into the first installation hole 160a to be fixed in the base 120 such that the first rotating lever unit 160 may be rotatably mounted on the second installation pin 124.

According to this embodiment of the present invention, the second installation pin 124 and the base 120 are separately formed, and then the second installation pin 124 is coupled to the base using a screw. However, the second installation pin 214 may be installed on the base 120 using various methods (interference fit, an adhesive or welding) or in any other suitable manner.

The working pin 162a and the first rotating lever unit 160 are integrally formed. The working pin 162a is disposed in the z-axis direction of FIG. 1 to apply a force to a movement portion 171 of the solenoid 170.

The solenoid 170, which is an operating unit, is fixed to the base 120 via an installation pin 125 or the like, which is placed on the base 120. The solenoid 170 includes the movement portion 171 and a driving portion 172.

When power is supplied to the solenoid 170, a magnetic force disappears to make the movement portion 171 to be movable. When power is not supplied to the solenoid 170, the movement portion 171 is fixed to the driving portion 172 by the magnetic force, and thus the movement portion 171 cannot move.

A slot 171a is formed in the movement portion 171. That is, in this example the slot 171a is formed by a predetermined length and the working pin 162a is inserted into the slot 171a so that it can slide through the slot 171a. Thus, a rotary motion of the first rotating lever unit 160 and a straight motion of the movement portion 171 can be simultaneously performed to a predetermined extent.

According to this example, the solenoid 170 is used as an operating unit. However, the movement portion 171 can be moved or fixed to the driving portion 172 according to electrical or mechanical signal, and other mechanical or electrical devices can be used rather than solenoid 170. For example, a mechanical trigger system, including an elastic spring, or a thermal, fluid, or static electricity operation system can be used instead of the solenoid 170.

The second rotating lever unit 180 is rotatably installed on the base 120. One end of the second rotating lever unit 180 constitutes a contacting portion 181 and other end of the second rotating lever unit 180 constitutes a hanging portion 182.

The contacting portion 181 contacts the movement portion 171. When the pop-up member 110 is in the shut position, the hanging portion 182 is configured to be hanged with the projection unit 112. A second installation hole 180a is formed in the center of the second rotating lever unit 180. A third installation pin 126 corresponding to the second installation hole 180a is installed on the base 120. The third installation pin 126 is disposed in the x-axis direction of FIG. 1.

Accordingly, since the third installation pin 126 is fixed to the base 120 and inserted into the second installation hole 180a and is fixed to the base 120, the second rotating lever unit 180 can rotate with respect to the third installation pin 126. In this example, the third installation pin 126 and the base 120 are separately formed from each other, and then the third installation pin 126 is installed on the base 120 using an interference fit. However, the third installation pin 126 and the base 120 may be integrally formed. In addition, the third installation pin 126 may be installed at the base 120 using other means such as an adhesive or welding.

The third elastic member 190 is a torsion coil spring that is inserted on the third installation pin 126. One end of the third elastic member 190 contacts the second rotating lever unit 180, and the other end of the third elastic member 190 contacts a spring hanging portion 127 formed on the base 120.

The third elastic member 190 is disposed so as to store elastic potential energy. That is, the elastic potential energy of the third elastic member 190 can be stored since when the second rotating lever unit 180 starts to rotate by moving the movement portion 171. Then, when the pop-up member 110 pops-up, and a force applied from the working pin 162a disappears, the second rotating lever unit 180 is rotated into an initial position due to the elastic force of the third elastic member 190. Then, the movement portion 171 returns into its shut position.

Figure 4A:
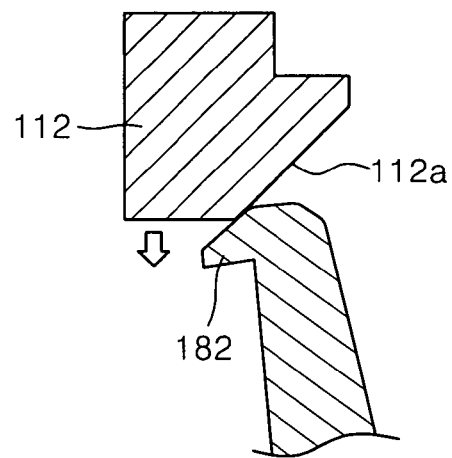
FIGS. 4A through 4C are schematic cross-sectional views illustrating an example of the cooperation state of a projection unit and a hanging portion when the pop-up member is in its shut position in the pop-up module of FIG. 1, according to an embodiment of the present invention.
Figure 4B:
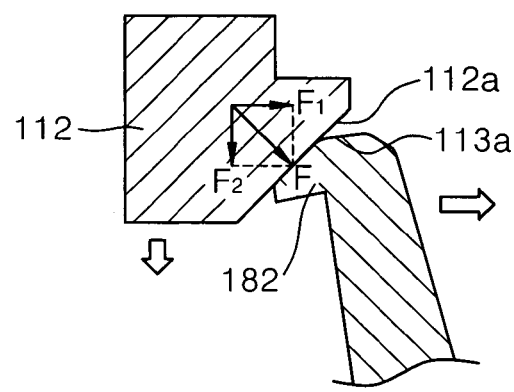
Figure 4C:
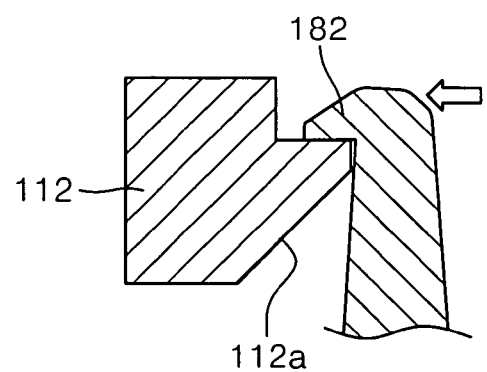

Hereinafter, an example of an operation of the pop-up module 100 will be described with reference to an inner structure of the pop up module 100, which has been described above. First, an operation in which the pop-up member 110 pops-up and is then restored to the shut position will be described. FIGS. 4A through 4C are schematic cross-sectional views illustrating an example of a cooperation state of the projection unit 112 and the hanging portion 182 when the pop-up member 110 is in its shut position, according to an embodiment of the present invention.

When a user presses the pop-up member 110 in order to restore it its shut position in the pop-up module 100, an inclined portion 112a of the projection unit 112 contacts the hanging portion 182, as shown in FIG. 4A. As the user continues to press the pop-up member 110, the inclined portion 112a of the projection unit 112 descends while contacting a surface of the hanging portion 182, as shown in FIG. 4B. At this time, the inclined portion 112a applies a predetermined force F to the hanging portion 182. A horizontal component $F_1$ of the predetermined force F moves the hanging portion 182 to the right. Then, the second rotating lever unit 180 rotates clockwise around the third installation pin 126, and the third elastic member 190 stores elastic potential energy.

Figure 5:
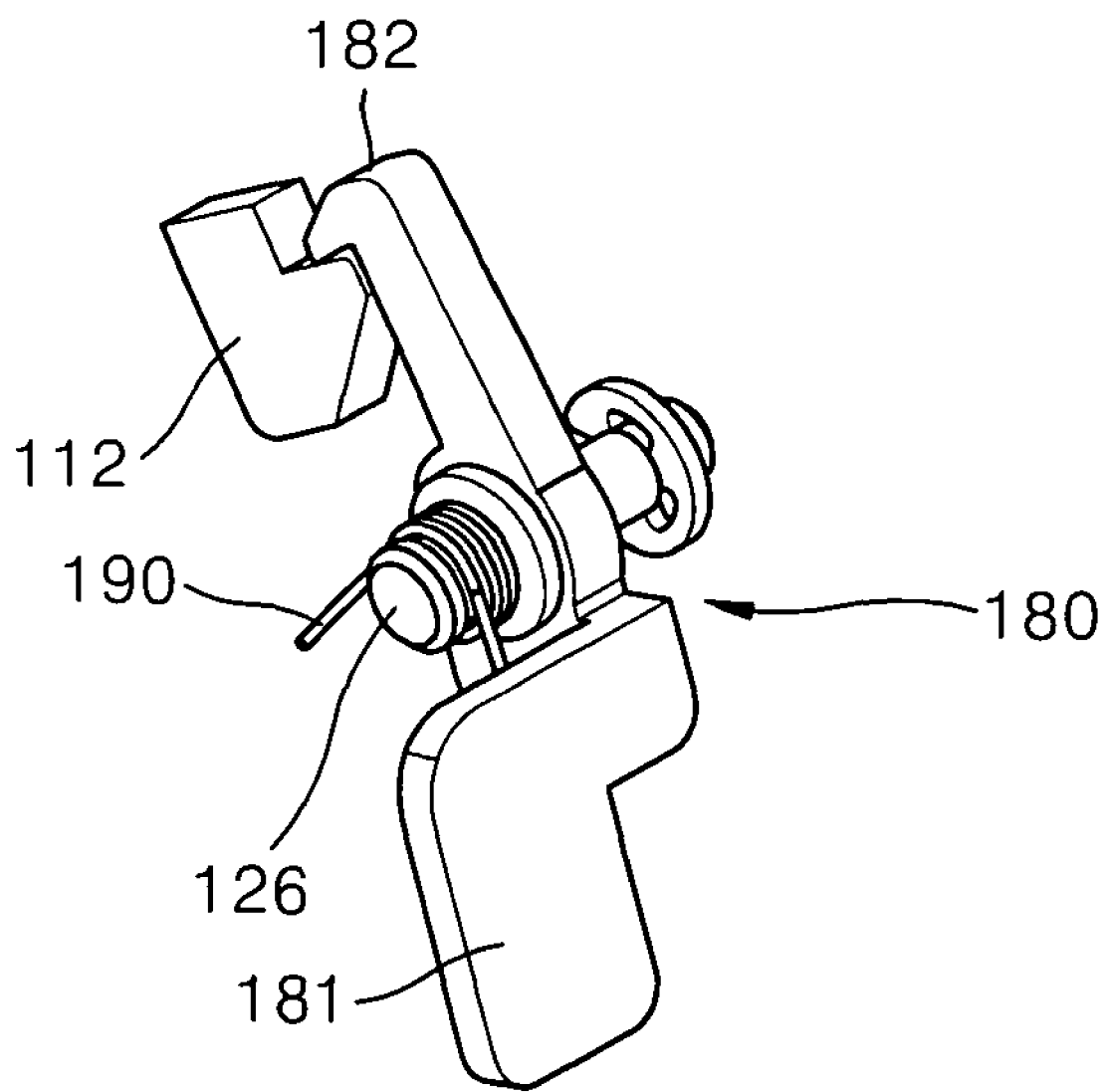
FIG. 5 is a perspective view illustrating an example of the cooperation state of a projection unit and a second rotating lever unit when the pop-up member is in its shut position in the pop-up module of FIG. 1, according to an embodiment of the present invention.

As the user continues to press the pop-up member 110, the hanging portion 182 escapes from the inclined portion 112a, and the horizontal component $F_1$ of the predetermined force F does not act on the hanging portion 182 any more. Accordingly, the hanging portion 182 moves to the left due to the elastic force of the third elastic member 190 and settles on the projection portion 112, as illustrated in FIGS. 4C and 5. Thus, the pop-up member 110 is restored to its shut position in the pop-up module 100. When the pop-up member 110 is in the original state, the first elastic member 130 stores elastic potential energy by receiving twisting moment, and the moving member 140 moves downward by being pressed by the pop-up member 110.

Figure 6:
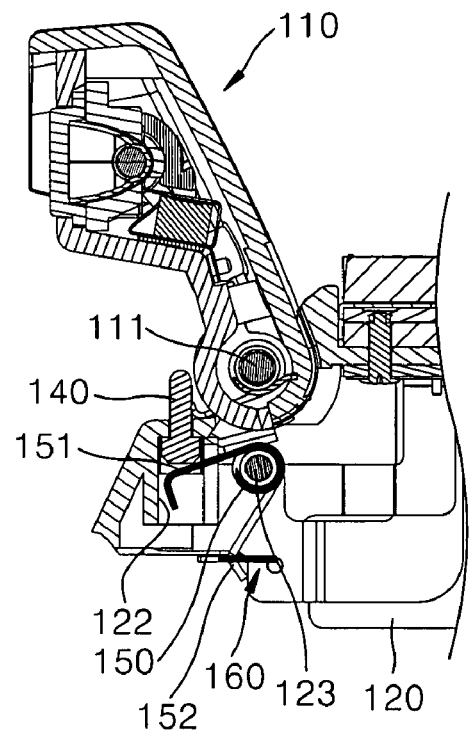
FIG. 6 is a cross-sectional view illustrating an example of the location of a moving member when the pop-up member in the pop-up module of FIG. 1 pops-up, according to an embodiment of the present invention.
Figure 7:
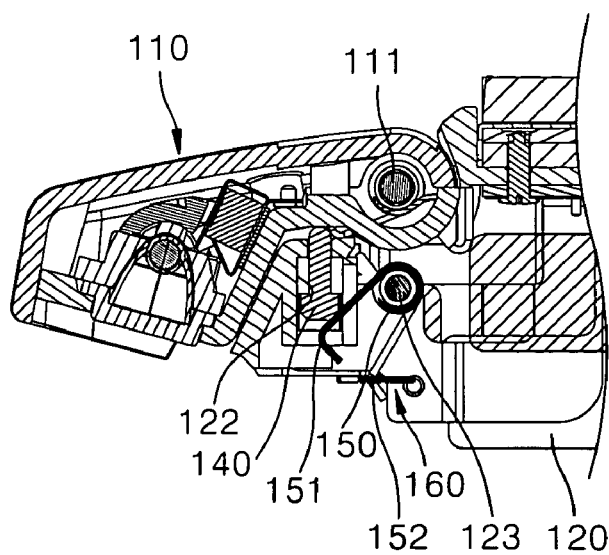
FIG. 7 is a cross-sectional view illustrating an example of the location of a moving member when the pop-up member is in its shut position in the pop-up module of FIG. 1, according to an embodiment of the present invention.

FIG. 6 is a cross-sectional view illustrating an example of the location of the moving member 140 when the pop-up member 110 is in a pop-up state, according to an embodiment of the present invention. FIG. 7 is an example of a cross-sectional view illustrating the location of the moving member 140 when the pop-up member 110 is restored to its shut position in the pop-up module 100, according to an embodiment of the present invention.

Referring to FIGS. 6 and 7, the moving member 140 is disposed in and moves along a guide hole 122. Thus, when the pop-up member 110 is restored from the pop-up state to its shut position in the pop-up module 100, the moving member 140 moves downward. In this case, the lower end of the moving member 140 presses the one end 151 of the second elastic member 150, and thus a twisting moment is applied to the second elastic member 150.

Figure 8:
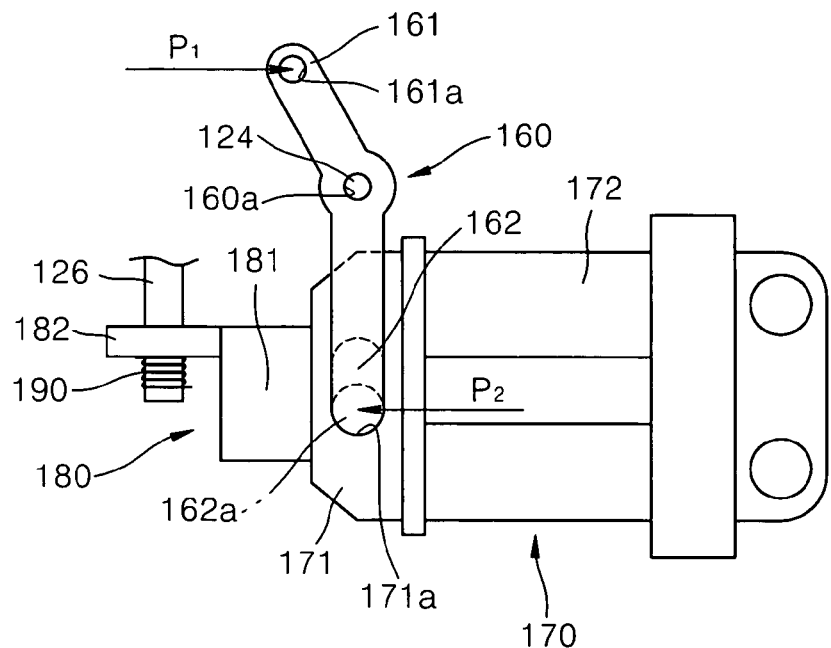
FIG. 8 is a schematic plan view illustrating an example of the cooperation state of a first rotating lever unit, a solenoid and a second rotating unit when the pop-up member is in its shut position in the pop-up module of FIG. 1, according to an embodiment of the present invention.

Thus, as illustrated in FIG. 8, the second elastic member 150 transfers a predetermined force $P_1$ to the first rotating lever unit 160. That is, the other end 152 of the second elastic member 150 presses the one end 161 of the first rotating lever unit 160 with the predetermined force $P_1$. Accordingly, the first rotating lever unit 160 rotates clockwise around the second installation pin 124 due to the predetermined force $P_1$, and the working pin 162a of the first rotating lever unit 160 presses an inner wall of the slot 171a of the movement portion 171 by a predetermined force $P_2$.

When the pop-up member 110 is in its shut position in the pop-up module 100, power is not supplied to the solenoid 170, and thus the movement portion 171 does not move. Thus, as illustrated in FIG. 8, the contacting portion 181 contacting the movement portion 171 does not move either, and thus the hanging portion 182 is still engaged with the projection unit 112. Thus, the pop-up member 110 is maintained in the shut position in the pop-up module 100.

Figure 9:
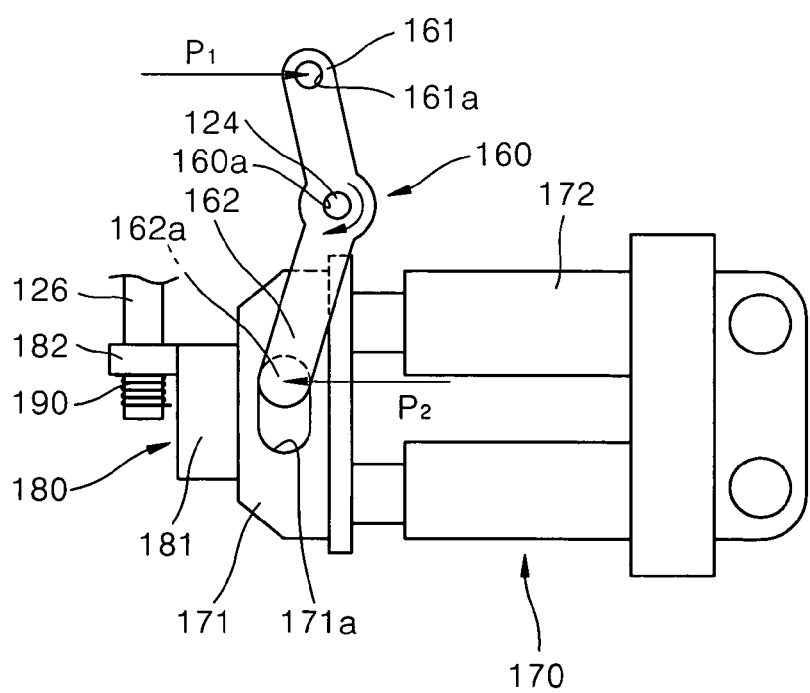
FIG. 9 is a schematic plan view illustrating an example of the cooperation state of a first rotating lever unit, a solenoid, and a second rotating unit when the pop-up member in the pop-up module of FIG. 1 pops-up, according to an embodiment of the present invention.
Figure 10:
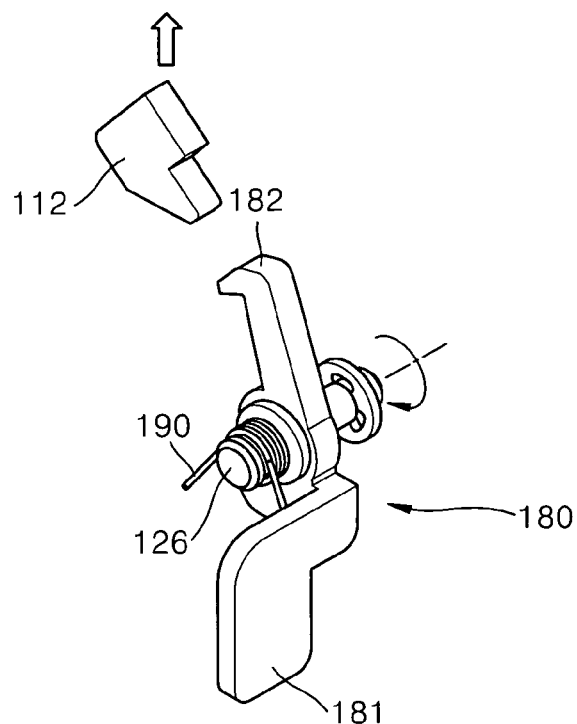
FIG. 10 is a view illustrating an example of the cooperation state of a projection unit and a second rotating lever unit when the pop-up member in the pop-up module of FIG. 1 pops-up, according to an embodiment of the present invention.
Figure 11:
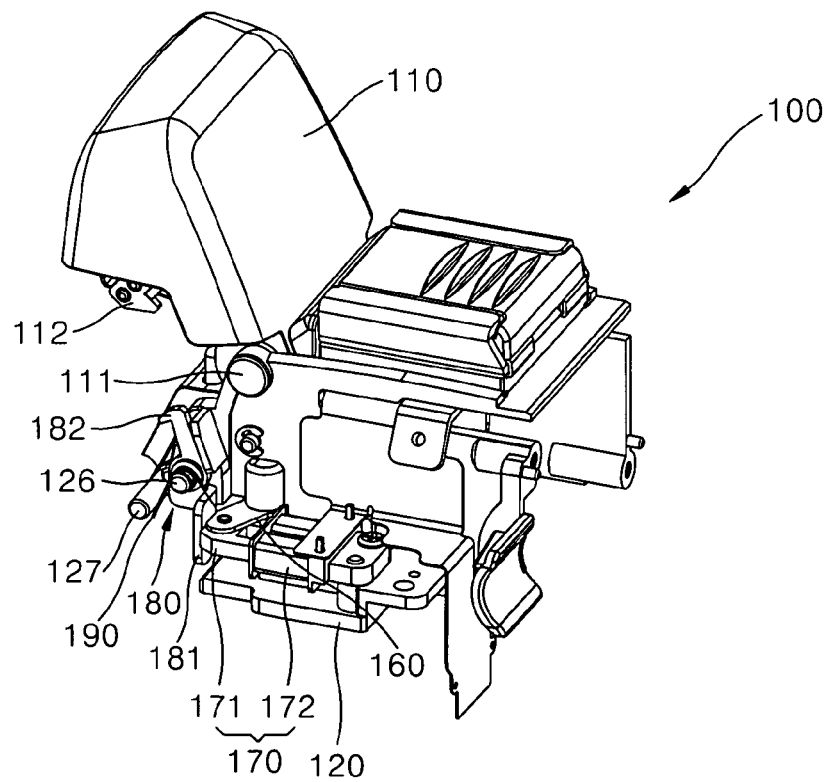
FIG. 11 is a partially perspective view illustrating an example of the pop-up module of FIG. 1 right after the pop-up member pops-up, according to an embodiment of the present invention.

FIGS. 9, 10, and 11 illustrate an example of the case when the pop-up module 100 pops-up from the shut position in the pop-up module 100. That is, FIG. 9 is a schematic plan view illustrating an example of the cooperation state of the first rotating lever unit 160, the solenoid 170 and the second rotating unit 180 when the pop-up member 110 pops-up, according to an embodiment of the present invention. FIG. 10 is a view illustrating an example of the cooperation state between a projection unit 112 and a second rotating lever unit 180 and the projection unit 112 when the pop-up member 110 pops-up, according to an embodiment of the present invention. FIG. 11 is a partially perspective view illustrating an example of the pop-up module 100 right after the pop-up member 110 pops-up, according to an embodiment of the present invention.

As described above, when the pop-up member 110 is in its shut position in the pop-up module 100, power is not supplied to the solenoid 170, and thus the movement portion 171 does not move. However, when power is supplied to the solenoid 170 in response to a user operation with regard to an inner control circuit, the magnetic force of the solenoid 170 disappears to make the movement portion 171 to be movable. Then, the working pin 162a of the first rotating lever unit 160 presses the movement portion 171 by a pushing force P2, and the moment portion 171 moves onward, as illustrated in FIG. 9.

When the movement portion 171 moves in a front direction, the contacting portion 181 also moves onward, as illustrated in FIGS. 9 and 10. Then, the second rotating lever unit 180 rotates clockwise. At this time, a twisting moment is applied to the third elastic member 190, and thus the third elastic member 190 stores elastic potential energy. The second rotating lever unit 180 can rotate since the pushing force $P_2$, which is generated by the second elastic member 150 and moves the movement portion 171 onwards, is greater than the elastic force of the third elastic member 190.

Likewise, the second rotating lever unit 180 rotates clockwise, and accordingly, the hanging portion rotates clockwise. Thus, while the projection unit 112 is escaping from the hanging portion, the pop-up member 110 automatically pops-up as illustrated in FIG. 11.

Hereinafter, an operation will be described after the pop-up member 110 is popped-up.

After the pop-up member 110 pops-up, the moving member 140, which is pressed by the pop-up member 110 in the shut position in the pop-up module 100, also moves upward, and thus the second elastic member 150 returns to its original shape. Thus, the force $P_1$ applied to the one end 161 of the first rotating lever unit 160 by the second elastic member 150 and the force $P_2$ applied to the movement portion 171 by the working pin 162a disappear.

Accordingly, only a pushing force is applied to the movement portion 171 by the contacting portion 181 due to the elastic force of the third elastic member 190. In this case, the movement portion 171 returns into its shut position. Meanwhile, the movement portion 171 returns into its shut position, and power is not applied to the solenoid 170. Thus, the movement portion 171 is fixed by a magnetic force.

As described above, an operation, in which the pop-up member 110 is in its shut position, an operation in which the pop-up member 110 pops-up, and an operation after the pop-up member 110 pops-up have been described.

Figure 12:
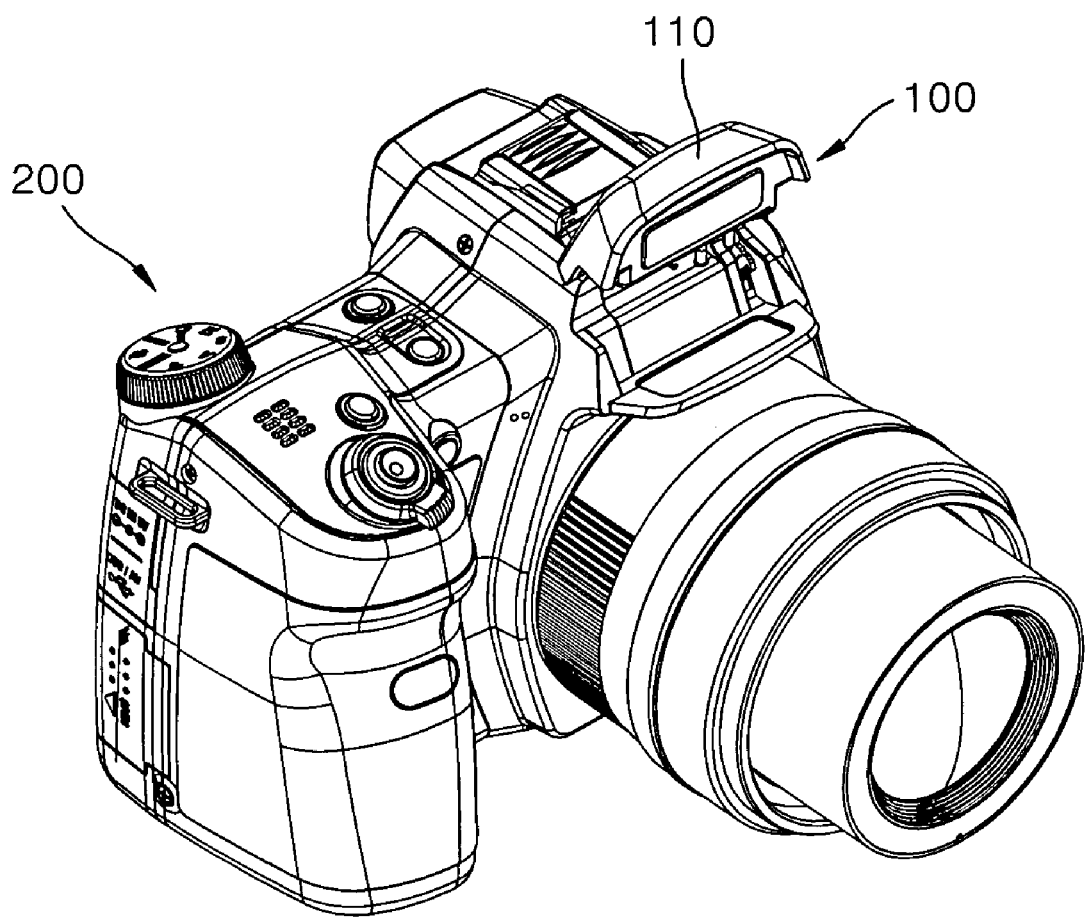
FIG. 12 is a view illustrating an example of an arrangement where a pop-up module used in a flash unit of a camera pops-up, according to an embodiment of the present invention.

FIG. 12 is a view for illustrating an example of a case where a pop-up module 100 used in a flash unit of a camera 200 pops-up, according to an embodiment of the present invention.

The pop-up module 100 used in the flash unit of the camera 200 includes a sensor that detects the light intensity outside the camera 200. When a user intends to take a picture and the light intensity is smaller than a predetermined value, the pop-up member 110 automatically pops-up under the control of an inner control device and a flash light is generated.

As described above, the pop-up module 100 according to the embodiment of the present invention can be modularized, and thus can be used in various apparatuses. In addition, since the pop-up module 100 according to the present invention has a relatively simple inner structure, the number of manufacturing steps and manufacturing costs can be reduced, and the pop-up module 100 can have a small volume as well. Accordingly, an electronic device in which the pop-up module 100 is installed can be easily miniaturized.

A pop-module according to an embodiment of the present invention is formed of a simple structure, and thus the pop up module can be miniaturized. Accordingly, an electronic device, in which the pop up module is installed, can be easily miniaturized. In addition, the pop up module according to the present invention is formed of a simple structure, and thus the number of manufacturing steps and manufacturing costs can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A pop-up module for an electronic device, comprising a pop-up member, and a base where the pop-up member is rotatably installed, wherein the pop up module comprise:
   a first elastic member that stores elastic potential energy according to a rotation motion of the pop-up member;
   a projection unit that is disposed at the pop-up member;
   a moving member that is pressed downward by the pop-up member when the pop-up member is in its shut position in the pop-up module;
   a second elastic member, one end of which receives twisting moment by the moving member when the pop-up member is moved to its shut position in the pop-up module;
   a first rotating lever unit installed rotatably on the base, wherein one end of the first rotating lever unit receives a force from the second elastic member when the pop-up member is in its shut position in the pop-up module, and a working pin is installed on other end of the first rotating lever unit;

a operating unit including a movement portion having a slot into which the working pin is inserted, and a driving portion driving the movement portion;

a second rotating lever unit rotatably installed on the base, wherein one end of the second rotating lever unit is a contacting portion contacting the movement portion, and other end of the second rotating lever unit is a hanging portion that engages with the projection unit when the pop-up member is in its shut position in the pop-up module; and a third elastic member that stores elastic potential energy when the second rotating lever unit is rotated.

2. The pop-up module of claim 1, wherein the pop-up member is installed on the base using a hinge structure.

3. The pop-up module of claim 2, wherein the first elastic member includes a torsion coil spring that is arranged around a hinge pin of the hinge structure.

4. The pop-up module of claim 1, wherein a groove is formed in a bottom surface of the moving member, and one end of the second elastic member is inserted in the groove.

5. The pop-up module of claim 1, wherein the second elastic member includes a torsion coil spring.

6. The pop-up module of claim 5, wherein the second elastic member is arranged around a first installation pin placed on the base.

7. The pop-up module of claim 1, wherein a first installation hole is formed in the first rotating lever unit and a second installation pin is inserted into the first installation hole to rotatably install the first rotating lever unit on the base.

8. The pop-up module of claim 1, wherein an installation hole is formed in a part of the first rotating lever unit which receives a force from the second elastic member, and a part of the second elastic member is inserted into the installation hole.

9. The pop-up module of claim 1, wherein the operating unit includes a solenoid.

10. The pop-up module of claim 9, wherein when power is supplied to the solenoid, a magnetic force is discontinued to make the movement portion movable, and when a power is not supplied to the solenoid, the movement portion is fixed due to the magnetic force.

11. The pop-up module of claim 1, wherein when the movement portion is movable, the movement portion presses the contacting portion due to an elastic force of the second elastic member to move the second rotating lever.

12. The pop-up module of claim 1, wherein when the movement portion applies a force to the contacting portion to rotate the second rotating lever unit, the projection unit disengages from the hanging portion.

13. The pop-up module of claim 12, wherein when the projection unit disengages from the hanging portion, the elastic potential energy stored in the first elastic member drives the pop-up member to its pop-up position.

14. The pop-up module of claim 1, wherein a second installation hole is formed in the second rotating lever unit, and a third install pin is inserted into the second installation to rotatably install the second rotating lever unit.

15. The pop-up module of claim 14, wherein the third elastic member includes a torsion coil spring that is arranged around the third install pin.

16. The pop-up module of claim 1, wherein when the pop-up member is moved toward its shut position in the pop-up module, an inclined portion of the projection unit contacts the hanging portion.

17. The pop-up module of claim 16, wherein when the pop-up member reaches its shut position in the pop-up module, the hanging portion passes from the inclined portion of the projection unit and becomes engaged with the projection unit.

18. The pop-up module of claim 1, wherein the moving member contacts the pop-up member through an opening in a portion of the base.

19. The pop-up module of claim 1, wherein the electronic device includes a photographing apparatus and the pop-up member includes a light emitting unit of the photographing apparatus.

* * * * *